March 1, 1960  G. A. LYON  2,926,954
WHEEL COVER WITH WEIGHT RETAINING CLIP
Filed Oct. 4, 1955
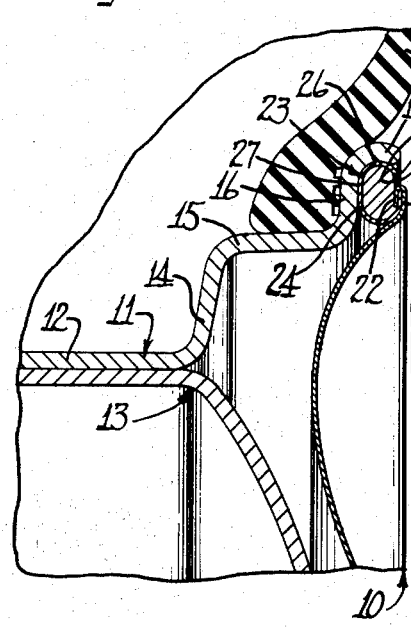
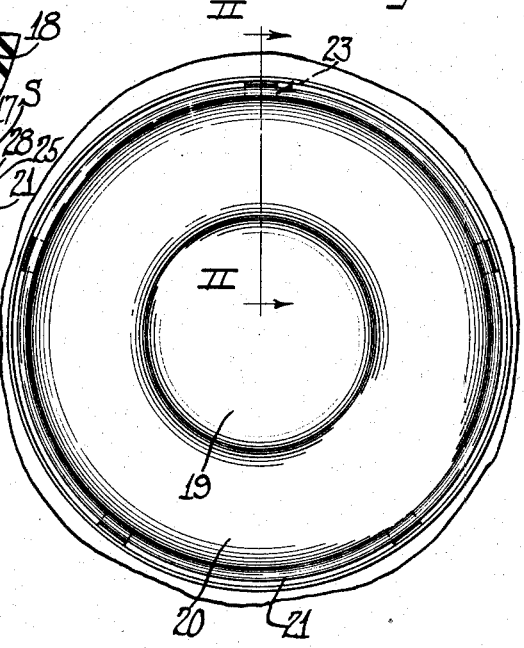
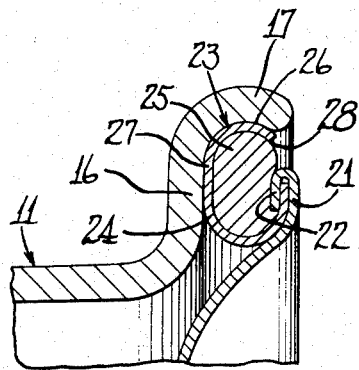
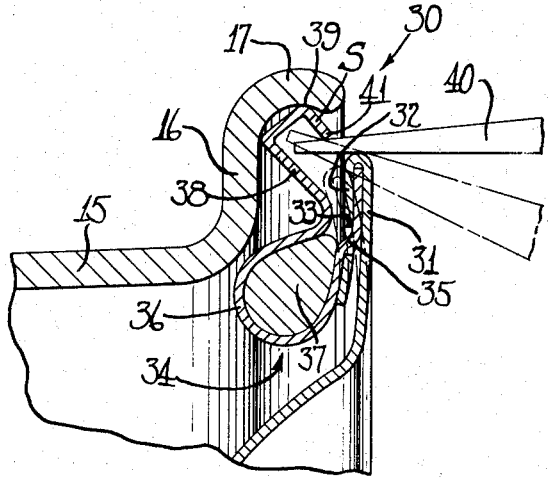
Inventor
George Albert Lyon

United States Patent Office 2,926,954
Patented Mar. 1, 1960

2,926,954

WHEEL COVER WITH WEIGHT RETAINING CLIP

George Albert Lyon, Detroit, Mich.

Application October 4, 1955, Serial No. 538,308

17 Claims. (Cl. 301—5)

This invention relates generally to a novel wheel structure and more particularly to a novel retaining clip construction for maintaining a wheel cover upon a vehicle wheel.

At the present time it is common practice to maintain wheel balancing weights, when needed, upon a wheel independently of the assembly of the cover upon the wheel. The present invention contemplates providing retaining clips of such construction as to be capable of carrying wheel balancing weights and in that manner permit the weights to be assembled upon the wheel at the same time that the wheel cover is.

Accordingly, it is an object of this invention to provide a new and improved retaining clip construction for maintaining a wheel cover upon a vehicle wheel.

Still another object of this invention is to provide a novel retaining clip construction having means for carrying wheel balancing weights.

Yet another object of this invention is to provide a novel cover clip construction having means to prevent relative turning of the clip and cover.

Another object of this invention is to provide a retaining clip construction which utilizes the tensioning forces that maintains the cover upon the wheel to enhance and augment the gripping engagement between the clip and wheel balancing weight.

A still further object of this invention is to provide a novel cover and clip construction which lends itself to economical manufacture on a large production basis.

According to the general features of this invention there is provided in a wheel structure including rim and body parts provided with an axial flange, a circular wheel cover for disposition on the outer side of the wheel having a plurality of circumferentially spaced cover retaining clips with at least one of the clips having a resilient looped portion, a wheel balancing weight in the looped portion in tensioned retained engagement therewith, the clip having a resilient wheel engaging surface capable of resilient tensioned engagement with the axial flange thereby maintaining the cover on the wheel whereby the resilient engagement of the clips upon the wheel enhance the retaining action between the clip and wheel balancing weight.

Other objects and features of this invention will more fully appear from the following detailed description taken in connection with the accompanying drawing which illustrates several embodiments thereof and in which:

Figure 1 is a front elevation of my wheel structure showing in dotted lines my novel retaining clips;

Figure 2 is an enlarged fragmentary cross sectional view taken substantially on the line II—II of Figure 1 looking in the direction indicated by the arrows;

Figure 3 is an enlarged fragmentary cross sectional view similar to Figure 2 showing in greater detail the features of the present invention; and Figure 4 is an enlarged fragmentary cross sectional view similar to Figure 3 only illustrating a modified form of my invention.

As shown on the drawings:

The reference numeral 10 indicates generally my novel cover which is adapted to be carried upon a vehicle wheel including a tire rim 11 which has an attachment flange 12 secured to a body part or load sustaining body 13. The part 13 is adapted to be maintained upon the axle of a vehicle by means of bolts or the like extending through the bolt-on flange (not shown) of the body part 13.

The tire rim 11 includes a generally radially outwardly extending flange 14, a generally axially outwardly extending flange 15, and a generally radially outwardly extending flange 16, and terminating in a generally axially outwardly extending flange 17. It will be noted that terminal flange 17 is of an arcuate cross section which configuration more or less provides a shoulder S for purposes that will hereinafter become apparent.

Carried upon the tire rim 11 in a customary manner is a rubber vehicle wheel tire 18 which may be either of the tube or tubeless type and may be inflated by a valve stem (not shown).

The wheel cover 10 may be made of any suitable material although excellent results have been found to be obtainable through the use of stainless steel or other similar material. As is best seen in Figure 1, the cover 10 includes an elevated crown 19 which is connected to an annular dished area 20 having a raised up outer margin 21 which is turned under at its outer periphery to provide an attachment flange 22.

Sandwiched between the outer margin 21 and the turned under annular flange 22 at circumferentially spaced intervals are my novel retaining clips 23.

Each of the clips 23 are preferably of a resilient construction with excellent results being obtainable through making the clips out of spring steel. Each of the clips 23 include a resilient looped portion 24 defining a housing capable of receiving therein in tensioned engagement therewith a wheel balancing weight 25. Connected to the looped portion 24 is an arcuate resilient deflectable wheel engaging surface or leg or portion 26 capable of resilient tensioned engagement with the rim flange 17 when the cover assembly is mounted upon the wheel. As will be appreciated from Figure 2, surface 26 is of an arcuate configuration in a circumferential direction in order to be capable of biting engagement with the inner surface of the rim flange 17.

In assembling the clips upon the cover it will be appreciated that any suitable number of clips may be utilized. After the clips have been assembled upon the cover 10, and after centering and truing the wheel, and determining where if any wheel balancing weights will be needed, the weights are assembled with the clips in the following manner. Upon the application of a radial outward force upon portion 26 an arcuate weight 25 may be slid into the housing defined by the looped portion 24 and upon release of the portion 26 tensioned engagement may be effected.

At this point, the cover may be then assembled with the wheel. To this end, the cover 10 is initially centered with respect to the wheel with portion 26 loosely engaged against terminal rim flange 17. Upon the application of an axially inward force, surface 26 is progressively cammed and tensioned and thereafter snapped behind shoulder S into retained assembly upon the wheel. It will be appreciated that as a result of the tensioned engagement effected between the tire rim and clip that the over all gripping action between the clip and wheel balancing weight 25 is considerably enhanced.

In order to positively position the cover with respect to the wheel, the clip 23 has been particularly constructed to have a flat portion 27 capable of bottoming against radial rim flange 16 in cushioned engagement therewith thereby limiting axial deflection of the cover.

Removal of the cover 10 from the wheel may be effected by inserting a suitable pry-off tool (not shown) under depending free terminal 28 and upon the application of a pry-off force, the cover may be removed from tensioned engagement with the wheel.

In Figure 4 is shown a modified cover and clip assembly 30. Cover 30 has an outer margin 31 which is turned under at its annular periphery forming an annular flange 32 which is provided with circumferentially spaced openings 33.

In this instance I have provided a novel clip 34 having a stepped terminal 35 which may be inserted between the cover flange 32 and margin 31 through openings 33 in interlocked engagement therewith. In so doing, relative turning of the cover and clip may be precluded.

Connected to the stepped terminal 35 is a resilient looped portion 36 defining a housing for receiving a wheel balancing weight 37. Connected to the looped portion 36 is a goose-neck portion 38 having an arcuate wheel engaging surface 39 capable of tensioned engagement with rim flange 17 to retain the cover upon the wheel.

In this instance it is contemplated that the action of the clip operate in much the same manner as in the first form of my invention. To this end, after the clips have been assembled upon the cover, upon the exertion of a slightly radially outward force upon goose-necked portion 38, wheel balancing weights 37 may be inserted within the housing defined by looped portion 36 to effect tensioned engagement between same.

Assembly of the cover with respect to the wheel may be brought about by centering the cover with reference thereto and upon the application of an axially inward force the goose-necked portion 38 and more particularly arcuate surface 39 is engaged against rim flange 17 in tensioned engagement behind shoulder S.

In view of the fact that the clips are stressed radially inwardly when assembled upon the tire rim 11, the same force is utilized to supplement and enhance the gripping action between wheel balancing weight 37 and resilient looped portion 36.

Axially inward deflection of the cover is prohibited since resilient looped portion 36 is adapted to bottom against the junction of rim flanges 15 and 16 in cushioned relation therewith.

Removal of the cover 30 from the wheel may be effected by inserting a suitable pry-off tool 40 underneath depending terminal 41 and upon the application of a downward pry-off force the margin 31 is flexed axially inward thereby allowing rim engaging surface 39 to be forcefully disengaged from shoulder S.

It will be understood that modifications and variations may be effected without departing from the scope of the novel concepts of the present invention.

I claim as my invention:

1. In a wheel structure including rim and body parts provided with an axial flange, a circular wheel cover for disposition on the outer side of the wheel having a plurality of circumferentially spaced cover retaining clips with at least one of the clips having a resilient looped portion, a wheel balancing weight mounted in said looped portion in tensioned retained engagement therewith, with said weight being disposable in assembly with said looped portion only before said cover is assembled on the wheel, said clip having a resilient wheel engaging surface capable of resilient tensioned engagement with said axial flange thereby maintaining the cover on the wheel whereby the resilient engagement of the clips upon the wheel enhances the retaining action between the clip and wheel balancing weight and precludes relative movement between the weight and the looped portion.

2. In a wheel structure including rim and body parts provided with an axial flange, a circular wheel cover for disposition on the outer side of the wheel having a plurality of circumferentially spaced cover retaining clips with at least one of the clips having a resilient looped portion, a wheel balancing weight mounted in said looped portion in tensioned retained engagement therewith, with said weight being disposable in assembly with said looped portion only before said cover is assembled on the wheel, said clip having a resilient wheel engaging surface capable of resilient tensioned engagement with said axial flange thereby maintaining the cover on the wheel whereby the resilient engagement of the clips upon the wheel enhances the retaining action between the clip and wheel balancing weight and precludes relative movement between the weight and the looped portion, said clip having a free terminal depending in assembly from said axial flange capable of receiving a pry-off tool therebehind to release the retaining engagement between said clip and axial flange.

3. In a wheel structure including rim and body parts provided with an axial flange, a circular wheel cover for disposition on the outer side of the wheel having a plurality of circumferentially spaced cover retaining clips with at least one of the clips having a resilient looped portion, a wheel balancing weight mounted in said looped portion in tensioned retained engagement therewith, with said weight being disposable in assembly with said looped portion only before said cover is assembled on the wheel, said clip having a resilient wheel engaging surface capable of resilient tensioned engagement with said axial flange thereby maintaining the cover on the wheel whereby the resilient engagement of the clips upon the wheel enhances the retaining action between the clip and wheel balancing weight, said cover having an underturned portion spaced axially of the cover with slots at circumferentially spaced intervals, and with ends of said clips extending through said slots in interlocked assembly between said underturned portion and said cover.

4. In a wheel structure including rim and body parts provided with an axial flange, a circular wheel cover for disposition on the outer side of the wheel having a plurality of circumferentially spaced cover retaining clips with each of the clips having a resilient looped portion, a wheel balancing weight mounted in at least one of said looped portions in tensioned engagement therewith, with said weight being disposable in assembly with said looped portion only before said cover is assembled on the wheel, said clips having a resilient wheel engaging surface capable of resilient tensioned engagement with said axial flange thereby maintaining the cover upon the wheel whereby the resilient engagement of the clips upon the wheel enhances the retaining action between the clip and wheel balancing weight and precludes relative movement between the weight and the looped portion.

5. In a wheel structure including rim and body parts provided with an axial flange, a circular wheel cover for disposition on the outer side of the wheel having a plurality of circumferentially spaced cover retaining clips with each of the clips having a resilient looped portion, a wheel balancing weight mounted in at least one of said looped portions in tensioned engagement therewith, with said weight being disposable in assembly with said looped portion only before said cover is assembled on the wheel, said clips having a resilient wheel engaging surface rearwardly of a pry-off clip terminal angled away from the rim with the clip surface in resilient tensioned engagement with said axial flange thereby maintaining the cover upon the wheel whereby the resilient engagement of the clips upon the wheel enhances the retaining action between the clip and wheel balancing weight and precludes relative movement between the weight and the looped portion, said clips each being interlocked with the outer margin of the cover in retaining cooperation with an axial terminal rim flange.

6. In a wheel structure including rim and body parts provided with an axial flange, a circular wheel cover for disposition on the outer side of the wheel having a plurality of circumferentially spaced cover retaining clips with each of the clips having a resilient looped portion, a wheel balancing weight mounted in at least one of said looped portions in tensioned engagement therewith, with said weight being disposable in assembly with said looped portion only before said cover is assembled on the wheel, said clips having a resilient wheel engaging surface rearwardly of a pry-off clip terminal angled away from the rim with the clip surface in resilient tensioned engagement with said axial flange thereby maintaining the cover upon the wheel whereby the resilient engagement of the clips upon the wheel enhances the retaining action between the clip and wheel balancing weight and precludes relative movement between the weight and the looped portion, said clips each being interlocked to said cover and additionally each having means to insure against turning of the clip relative to the cover.

7. In a wheel structure including rim and body parts provided with an axial flange, a circular wheel cover for disposition on the outer side of the wheel having a plurality of circumferentially spaced cover retaining clips with each of the clips having a resilient looped portion, a wheel balancing weight mounted in at least one of said looped portions in tensioned engagement therewith, with said weight being disposable in assembly with said looped portion only before said cover is assembled on the wheel, said clips having a resilient wheel engaging surface rearwardly of a pry-off clip terminal angled away from the rim with the clip surface in resilient tensioned engagement with said axial flange thereby maintaining the cover upon the wheel whereby the resilient engagement of the clips upon the wheel enhances the retaining action between the clip and wheel balancing weight and precludes relative movement between the weight and the looped portion, each of said clips having a portion engageable against the wheel to cushion axial impacts and to minimize axial deflection of the cover.

8. In a wheel structure including rim and body parts provided with an axial flange, a circular wheel cover for disposition on the outer side of the wheel having a plurality of circumferentially spaced cover retaining clips with each of the clips having a resilient looped portion, a wheel balancing weight mounted in at least one of said looped portions in tensioned engagement therewith, with said weight being disposable in assembly with said looped portion only before said cover is assembled on the wheel, said clips having a resilient wheel engaging surface rearwardly of a pry-off clip terminal angled away from the rim with the clip surface in resilient tensioned engagement with said axial flange thereby maintaining the cover upon the wheel whereby the resilient engagement of the clips upon the wheel enhances the retaining action between the clip and wheel balancing weight and precludes relative movement between the weight and the looped portion, said cover having an underturned margin provided with openings at circumferentially spaced intervals, and each of the clips having a stepped portion extending through one of the openings into interlocked relation between said cover and underturned margin thereby preventing turning of the clip in assembly.

9. In combination, a wheel cover retaining clip and a wheel balancing weight capable of extending from a cover to retain same upon a vehicle wheel, the improvement of the said clip having a resilient looped portion defining a housing with said wheel balancing weight mounted in tensioned retained engagement in said portion and with said weight being insertable into the looped portion only prior to assembly of the cover on the wheel, said clip having a resilient deflectable wheel engaging surface capable of resilient tensioned engagement with a wheel when mounted upon a cover whereby the tensioned engagement of the clip in assembly with the wheel enhances the retaining action between said resilient looped portion and wheel balancing weight precluding relative movement between the engaged weight and looped portion.

10. In a wheel structure having a wheel with rim and body parts including an axially extending terminal rim flange, a cover assembly for disposition on the outer side of the wheel including an outer margin having an outer marginal edge spaced away from the terminal rim flange, circumferentially spaced extensions carried by said cover underneath said margin for holding the cover in assembly with the wheel, said extensions having a first looped portion with a wheel balancing weight removably disposed therein before the cover is assembled upon the wheel and having a resiliently deflectable portion in cover retaining engagement with said terminal rim flange, said deflectable portion having an extension terminal extending away from the place of engagement with the terminal rim flange and spaced from the marginal edge so a pry off tool may be levered upon the outer marginal edge and engaged behind said extension terminal to disengage the extension from tensioned engagement with the terminal rim flange.

11. In a wheel structure including rim and body parts provided with an axial flange, a circular wheel cover for disposition on the outer side of the wheel having a plurality of circumferentially spaced cover retaining clips with each of the clips having a resilient looped portion, a wheel balancing weight mounted in at least one of said looped portions in tensioned engagement therewith with said weight being disposable in assembly with said looped portion only before said cover is assembled on the wheel, said clips having a resilient wheel engaging surface capable of resilient tensioned engagement with said axial flange thereby maintaining the cover upon the wheel whereby the resilient engagement of the clips upon the wheel enhances the retaining action between the clip and wheel balancing weight and precludes relative movement between the weight and the looped portion, the looped portions for carrying the weights each being generally C-shaped and with a radially outer leg of the C being engaged on its radially outer surface with the axial flange and with the radially outer leg being engaged on its radially inner surface with the weight.

12. In a wheel structure having a wheel with rim and body parts, a cover assembly for disposition on the outer side of the wheel having an outer marginal edge, circumferentially spaced clips between said cover and wheel for holding the clips in assembly with the wheel, said clips having a first looped portion with a wheel balancing weight removably disposed therein and having a resiliently deflectable clip terminal extending away from the wheel and spaced from the cover edge so a pry off tool may be levered upon the outer marginal edge and engaged behind said clip terminal to disengage the clip from tensioned engagement with the wheel.

13. In a wheel structure including a wheel having rim and body parts, a cover for overlying disposition upon the wheel having a plurality of circumferentially spaced retaining clips with at least one of the clips having a looped portion extending from the cover and a free terminal having an engaging surface capable of snap-on, pry-off engagement upon the wheel, said looped portion defining a housing capable of receiving a wheel balancing weight therein, a wheel balancing weight in said housing, said terminal portion flexing at its junction with said looped portion upon application of the cover to said wheel with the wheel balancing weight acting as a back-up for said engaging surface in assembly, said cover having an outer cover margin spaced from the wheel and radially inwardly of said engaging surface on said clip and with said free terminal extending away from the wheel beyond its engaging surface providing a pry-off tip enabling a pry-off tool to be engaged behind said tip and fulcrumed on said outer cover margin to release the clip from retaining engagement with the wheel.

14. In a wheel structure including a wheel having rim and body parts, a cover for overlying disposition upon the wheel having a plurality of circumferentially spaced retaining clips with each of the clips having a free terminal provided with a wheel engaging surface capable of snap-on, pry-off engagement upon the wheel, said free terminal comprising a channeled portion opening generally outwardly of and in a direction away from the wheel and with the channeled portion being resiliently deflectable from its radially inner marginal area, said cover having an outer cover margin spaced from the wheel and radially inwardly of said wheel engaging surface on said channeled portion and with the free terminal extending away from the wheel beyond its wheel engaging surface providing a pry-off tip enabling a pry-off tool to be engaged behind said tip and fulcrumed on said outer cover margin to release the clip from retaining engagement with the wheel.

15. In a wheel structure including a wheel having rim and body parts, a circular cover member for overlying disposition upon the wheel having circumferentially spaced spring clips extending therefrom capable of retaining the cover member on said wheel, a wheel balancing weight carried by one of said clips, each of said clips having a looped portion defining a housing capable of retaining said wheel weight therein, a pry-off leg connected to said looped portion and extending outwardly from the wheel, the clip having a wheel engaging surface for snap-on, pry-off engagement with said wheel.

16. In a wheel structure including a wheel having rim and body parts, a circular cover member for overlying disposition upon the wheel having circumferentially spaced spring clips extending therefrom capable of retaining the cover member on said wheel, a wheel balancing weight carried by one of said clips, each of said clips having a looped portion defining a housing capable of retaining said wheel weight therein, a pry-off leg connected to said looped portion and extending outwardly from the wheel, the clip having a wheel engaging surface for snap-on, pry-off engagement with said wheel, said looped portions each having a terminal interlocked to the cover at the outer margin of the cover.

17. In a wheel structure including a wheel having rim and body parts, a circular cover member for overlying disposition upon the wheel having circumferentially spaced spring clips extending therefrom capable of retaining cooperation with said wheel to maintain the cover in assembly therewith, each of said clips having a generally radially and axially outwardly opening looped portion defining a housing capable of receiving a wheel weight therein and having a terminal with an engaging surface for snap-on, pry-off engagement with said wheel, said terminal comprising a generally radially inwardly and axially outwardly opening hooked portion with a wheel engaging surface and having a free end extending away from the wheel engaging surface capable of being engaged by a pry-off tool, the free end on the hooked portion being disposed radially outwardly of the outer margin of the cover.

References Cited in the file of this patent

UNITED STATES PATENTS

| 2,361,406 | Lyon | Oct. 31, 1944 |
| 2,443,627 | Lyon | June 22, 1948 |
| 2,522,039 | Jacobsen et al. | Sept. 12, 1950 |
| 2,654,637 | Lyon | Oct. 5, 1953 |

FOREIGN PATENTS

| 380,791 | Italy | June 4, 1940 |